(12) United States Patent
Shepard

(10) Patent No.: US 10,046,613 B2
(45) Date of Patent: Aug. 14, 2018

(54) DUAL PURPOSE HITCH SENSOR

(71) Applicant: Daniel Robert Shepard, North Hampton, NH (US)

(72) Inventor: Daniel Robert Shepard, North Hampton, NH (US)

( * ) Notice: Subject to any disclaimer, the term of this patent is extended or adjusted under 35 U.S.C. 154(b) by 38 days.

(21) Appl. No.: 15/045,240

(22) Filed: Feb. 16, 2016

(65) Prior Publication Data

US 2016/0236526 A1    Aug. 18, 2016

Related U.S. Application Data

(60) Provisional application No. 62/117,433, filed on Feb. 17, 2015.

(51) Int. Cl.
*B60D 1/62* (2006.01)
*B60D 1/06* (2006.01)
*B60D 1/36* (2006.01)
*B62D 15/02* (2006.01)
*B62D 13/00* (2006.01)

(52) U.S. Cl.
CPC ............ *B60D 1/62* (2013.01); *B60D 1/06* (2013.01); *B60D 1/36* (2013.01); *B62D 13/00* (2013.01); *B62D 15/021* (2013.01)

(58) Field of Classification Search
CPC ... B60D 1/62; B60D 1/06; B60D 1/36; B62D 15/021; B62D 13/00
USPC ............. 33/264, 373, 483, 494, 534, 755, 33/758–760, 767; 701/1, 36, 41; 340/431; 280/419, 428, 432
See application file for complete search history.

(56) References Cited

U.S. PATENT DOCUMENTS

| | | | | |
|---|---|---|---|---|
| 3,720,000 A | * | 3/1973 | Schlegel | B60D 1/36 280/477 |
| 3,731,274 A | * | 5/1973 | Green | B60D 1/38 280/400 |
| 3,833,928 A | * | 9/1974 | Gavit | B60Q 1/305 280/400 |
| 3,938,122 A | * | 2/1976 | Mangus | B60D 1/36 280/477 |
| 4,030,775 A | * | 6/1977 | Hill | B60D 1/36 280/477 |
| 4,040,006 A | * | 8/1977 | Kimmel | B60Q 1/305 200/61.44 |
| 4,122,390 A | * | 10/1978 | Kollitz | B60D 1/065 280/432 |
| 4,205,453 A | * | 6/1980 | Steele | B60D 1/38 280/477 |
| 5,191,328 A | * | 3/1993 | Nelson | B60D 1/36 250/491.1 |

(Continued)

*Primary Examiner* — R. A. Smith
*Assistant Examiner* — Tania Courson

(57) ABSTRACT

The present invention relates to sensors for guiding a trailer while backing that can easily be installed or removed, and in particular to trailering system sensors that can be utilized for both measuring the angle formed by the vehicle and a coupled trailer (i.e., the angle formed by the centerline of the vehicle intersecting the centerline of the trailer) and the direction and/or distance to back up the vehicle during coupling. The present invention is a means and a method for sensing both the hitch angle during towing maneuvers and the direction and/or distance to the trailer to assist a driver to couple a vehicle and trailer together.

18 Claims, 8 Drawing Sheets

(56) References Cited

U.S. PATENT DOCUMENTS

| | | | | |
|---|---|---|---|---|
| 6,089,590 A * | 7/2000 | Bowers | B60D 1/36 | 280/477 |
| 6,480,104 B1 * | 11/2002 | Wall | B60D 1/36 | 280/477 |
| 6,806,809 B2 * | 10/2004 | Lee | B60D 1/58 | 280/419 |
| 7,715,953 B2 * | 5/2010 | Shepard | B60D 1/58 | 280/400 |
| 8,038,166 B1 * | 10/2011 | Piesinger | B60D 1/06 | 280/477 |
| 8,393,632 B2 * | 3/2013 | Vortmeyer | B60D 1/06 | 280/504 |
| 8,444,169 B1 * | 5/2013 | Katz | B60D 1/62 | 280/477 |
| 9,120,358 B2 * | 9/2015 | Motts | B60D 1/06 | |
| 9,132,856 B2 * | 9/2015 | Shepard | B62D 13/06 | |
| 9,227,474 B2 * | 1/2016 | Liu | B60D 1/245 | |
| 9,321,483 B2 * | 4/2016 | Headley | B60D 1/245 | |
| 9,335,162 B2 * | 5/2016 | Kyrtsos | G01B 21/02 | |
| 9,374,562 B2 * | 6/2016 | Trombley | B60R 1/003 | |
| 9,434,381 B2 * | 9/2016 | Windeler | B60W 30/09 | |
| 9,446,713 B2 * | 9/2016 | Lu | B60R 1/002 | |
| 9,464,887 B2 * | 10/2016 | Salter | H05B 37/0218 | |
| 9,513,103 B2 * | 12/2016 | Crossman | B62D 13/06 | |
| 9,517,668 B2 * | 12/2016 | Lavoie | B60D 1/305 | |
| 2001/0001563 A1 * | 5/2001 | Tomaszewski | H04N 1/00241 | 348/552 |
| 2002/0154005 A1 * | 10/2002 | Wall | B60D 1/36 | 340/431 |
| 2005/0128059 A1 * | 6/2005 | Vause | B60D 1/36 | 340/431 |
| 2006/0293800 A1 * | 12/2006 | Bauer | B60D 1/36 | 701/1 |
| 2013/0038436 A1 * | 2/2013 | Brey | B60T 7/16 | 340/431 |
| 2013/0253814 A1 * | 9/2013 | Wirthlin | G01G 19/02 | 701/124 |
| 2014/0358417 A1 * | 12/2014 | Lavoie | G01C 21/165 | 701/300 |
| 2015/0307129 A1 * | 10/2015 | Headley | B60D 1/245 | 701/41 |
| 2017/0008559 A1 * | 1/2017 | Shepard | B62D 13/06 | |
| 2017/0043807 A1 * | 2/2017 | Shepard | B60D 1/245 | |
| 2017/0073003 A1 * | 3/2017 | Shepard | B62D 13/06 | |
| 2017/0073004 A1 * | 3/2017 | Shepard | B62D 13/06 | |
| 2017/0089697 A1 * | 3/2017 | Shepard | G01B 21/22 | |
| 2017/0166168 A1 * | 6/2017 | Hache | B60R 25/24 | |
| 2018/0001720 A1 * | 1/2018 | McAllister | G01L 5/136 | |
| 2018/0001721 A1 * | 1/2018 | Huger | B60D 1/36 | |

* cited by examiner

PRIOR ART

DUAL PURPOSE HITCH SENSOR

CROSS-REFERENCE TO RELATED APPLICATION

This application makes reference to U.S. Provisional Patent application 62/117,433 by Shepard titled "DUAL PURPOSE HITCH SENSOR" which issued on Feb. 17, 2015 and which is incorporated herein in its entirety by reference. This application also makes reference to U.S. Pat. No. 7,715,953 (the '953 Patent) by Shepard titled "TRAILER BACKING UP DEVICE AND METHOD" which issued on May 11, 2010 and U.S. Pat. No. 9,132,856 (the '856 Patent), by Shepard titled "TRAILER BACKING UP DEVICE AND TABLE BASED METHOD" that issued on Sep. 15, 2015 and U.S. patent application Ser. No. 14/791,283 by Shepard titled "PORTABLE TRAILER GUIDANCE SYSTEM" that was filed on Jul. 3, 2015 and those applications are incorporated herein in their entirety by reference.

TECHNICAL FIELD

In various embodiments, the present invention relates to systems for guiding a trailer while backing and, in particular, the present invention relates to systems for guiding a trailer while backing that can easily be installed or removed.

BACKGROUND

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle. Various innovations have been introduced to address this problem in whole or in part. Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). While these solutions are helpful, they only each address a part of the backing problem. Shepard in his U.S. Pat. No. 7,715,953 teaches a complete working system. However, in that teaching, some new needs arise that are addressed by the teaching of the present invention, such as how to install a complete working system as an after market product that can easily be installed or removed and how to install a sensor for measuring the angle formed between the centerline of the vehicle and the centerline of the trailer (i.e., the hitch angle sensor or, as it is sometimes also known, the articulation angle sensor) such that it does not interfere or collide with the trailer tongue or any other parts of the hitching system. In particular, an angle sensor is needed that can get its measurement in-line with the axis of rotation of the trailer tongue upon the hitch ball (i.e., to measure the articulation angle of this hitch joint) without actually being located at that axis of rotation. This hitch angle sensor, in particular, must be designed not to be damaged either during hitching up a trailer (due to a collision between the hitch and sensor with a part of the trailer) nor while towing on the highway (due to kicked up debris).

Trailer guidance systems such as the portable system disclosed in U.S. Provisional Patent Application 62/020,526, by Shepard titled "PORTABLE TRAILER GUIDANCE SYSTEM" that was filed on Jul. 3, 2014 require sensors for detecting the hitch angle and the turning radius and output means for displaying the intended trailer destination. Most vehicles do not have integral turning sensors and most trailers and/or hitches do not have integral hitch angle sensors. A solution is to make a hitch angle sensor that can be added to an existing vehicle that did not have such capability leaving the automotive assembly line. Once such an investment in a hitch angle measurement sensor is made, it is possible to leverage this sensor for not only measuring the angle of the hitch, but to also adapt the angle measuring mechanism of the hitch angle sensor to create a guidance mechanism to assist a driver in backing up the vehicle in order to couple the vehicle to the trailer.

SUMMARY

The present invention relates to sensors for guiding a trailer while backing that can easily be installed or removed, and in particular to trailering system sensors that can be utilized for both measuring the angle formed by the vehicle and a coupled trailer (i.e., the angle formed by the centerline of the vehicle intersecting the centerline of the trailer) and the direction and/or distance to back up the vehicle during coupling. The present invention is a means and a method for sensing both the hitch angle during towing maneuvers and the direction and/or distance to the trailer to assist a driver to couple a vehicle and trailer together.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawing, in which.

DETAILED DESCRIPTION

Figure 1:
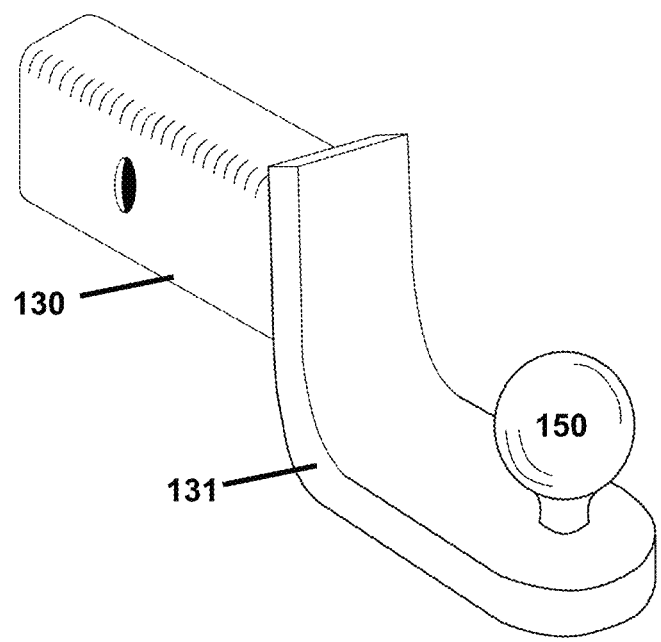
FIG. 1 depicts a hitch ball mounted on a hitch ball mount according to the prior art.

The present invention relates to systems for guiding a trailer while backing and to systems for guiding a hitch ball 150 to the proper location of a trailer tongue for coupling the hitch and trailer together. FIG. 1, illustrates a typical hitch ball mount 131 with a hitch ball 150 mounted. The hitch ball is typically a solid metal sphere with a stem extending from the bottom of the ball and whereby the bottom portion of the stem is threaded. The hitch ball mount 131 has a corresponding hole through it to enable inserting the threaded stem to pass through the hitch ball mount and be secured from below with a hitch ball nut.

Figure 2A:
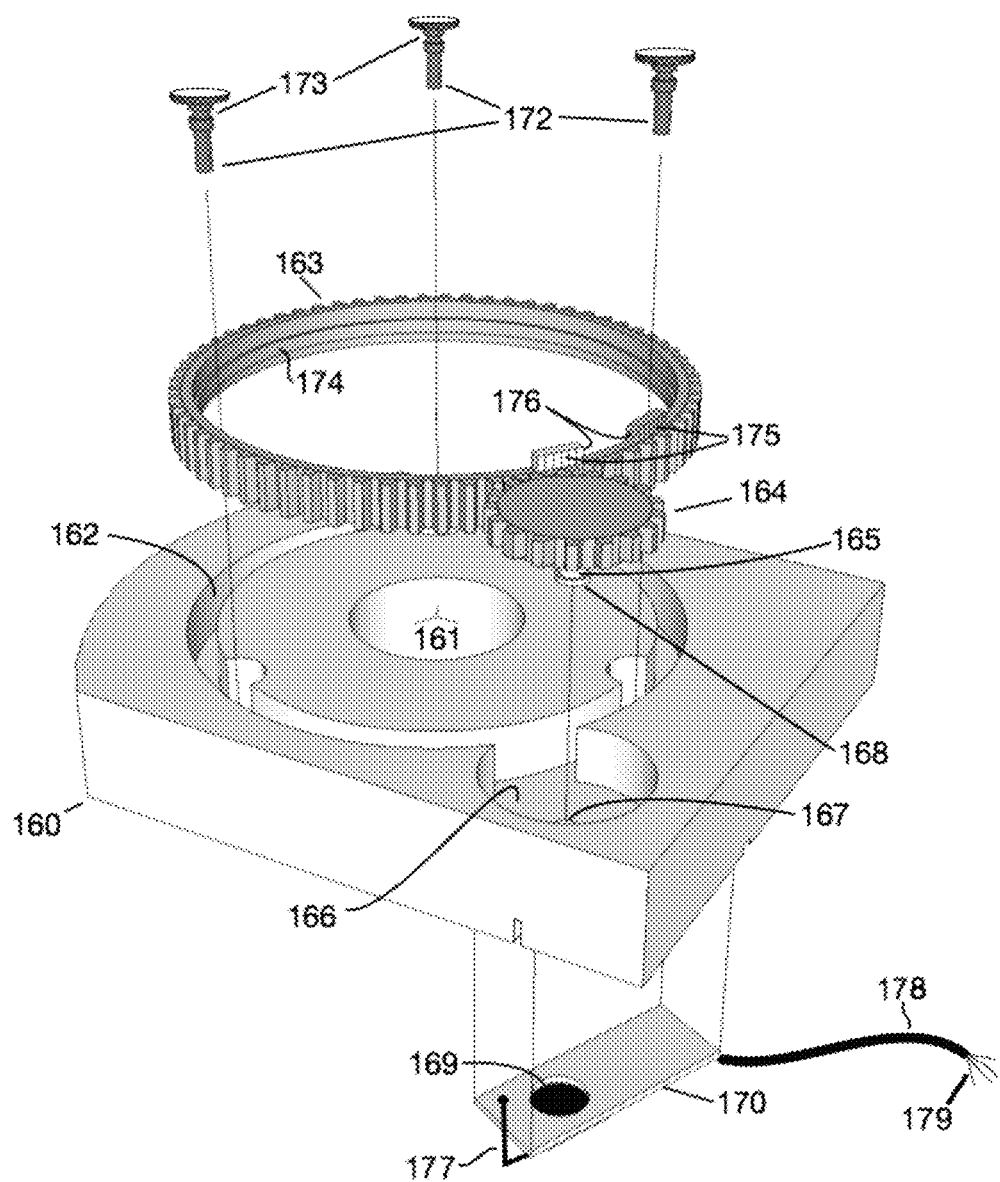
FIG. 2 depicts a hitch angle sensor adaptor plate in accordance with various embodiments of the invention.

FIG. 2A shows a possible configuration of a measurement device including an adaptor plate 160 according to the present invention. This plate 160 has a hole 161 that matches the hole in the hitch ball mount 131 such that the adaptor plate 160 can be inserted between the hitch ball 150 and hitch ball mount 131 when the hitch ball 150 is secured to the mount 131. This will secure the adaptor plate 160 between the ball and the mount. The plate 160 must not be significantly thicker than the amount of threaded stem that is exposed below the hitch ball nut when the hitch ball its mounted without the adaptor plate. This will enable an existing hitch ball 150 and hitch ball mount 131 to be separated and then reattached with the adaptor plate 160 in between. This approach will serve to keep costs low while keeping shipping costs low. By selling only the adaptor plate 160 to be added to an existing hitch ball and hitch ball mount, the weight of the product being shipped is greatly reduced (the hitch ball and the hitch ball mount are both made from heavy steel or other metal and would be costly to ship).

Figure 2B:
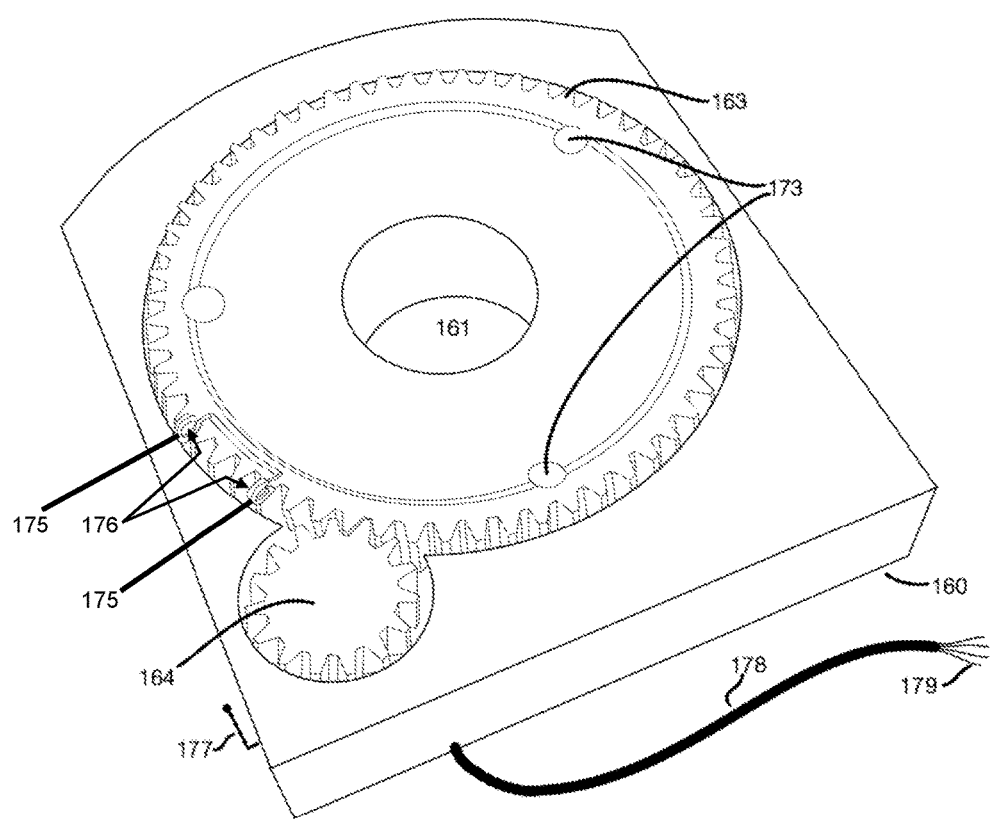
Figure 3:
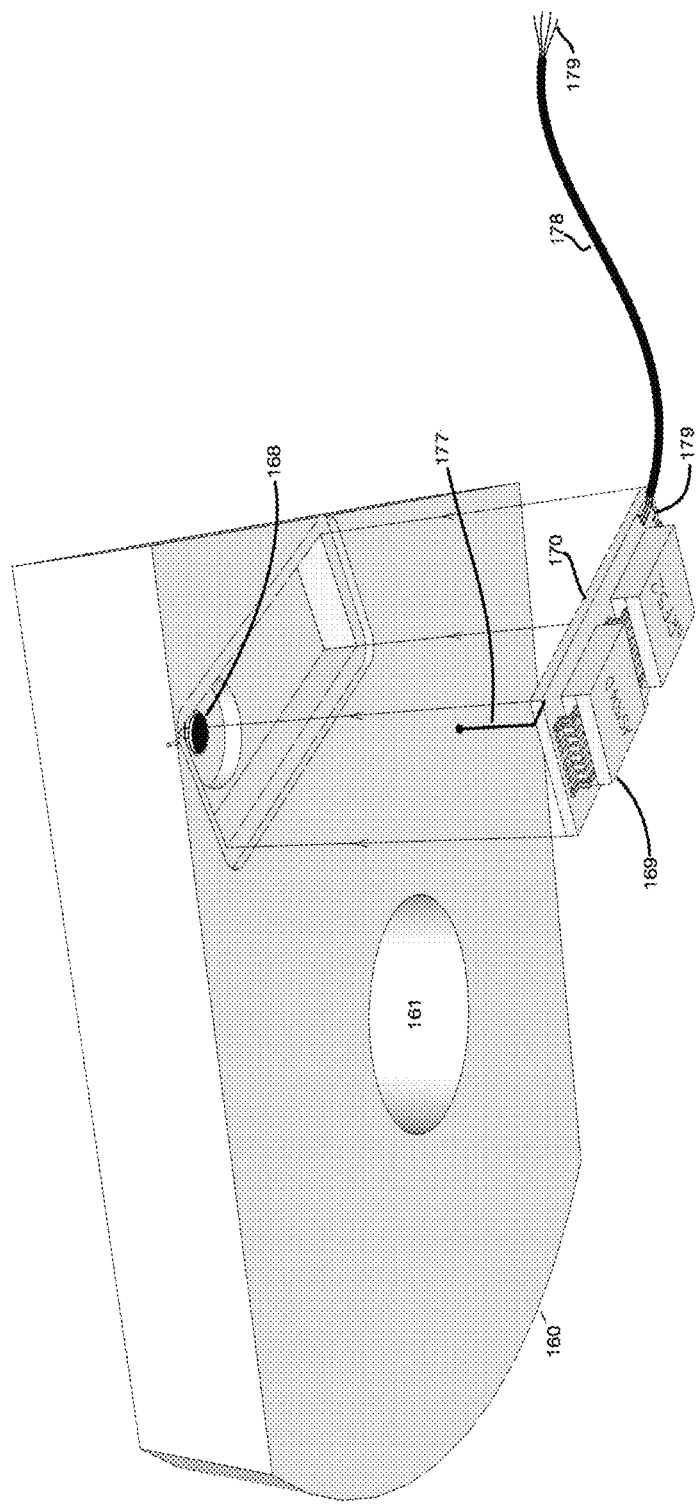
FIG. 3 depicts an x-ray view of the hitch angle sensor adaptor plate in accordance with various embodiments of the invention.

As shown in FIGS. 2A, 2B & 3, the adaptor plate has a circular groove 162 in which a toothed ring 163 is mounted on supporting spacers 172. These supporting spacers have a shoulder groove 173 that supports a corresponding inner shoulder 174 in toothed ring 163. This toothed ring 163 will match the teeth of a gear 164 mounted on a shaft 165 in a circular recess 166 in the top corner. This shaft 165 goes through a hole 167 to another gear which turns a final gear assembly that supports a diametrically magnetized permanent magnet 168 that is sensed by a rotation sensor integrated circuit 169 such as the Austrian Microsystems AS5040. Electronic circuitry mounted on a board 170 that is mounted in a recess at the back of the adaptor plate. This circuitry may also include wired 179 or wireless connection 177 to the backup guidance system (a wired connection could be made through the trailer wiring harness 178 and a wireless connection could be implemented using a Bluetooth communications link, a WiFi communications link, a ZigBee communications link or any other wireless connection); power could be provided through the wiring harness 178 or through the use of a battery.

Figure 4A:
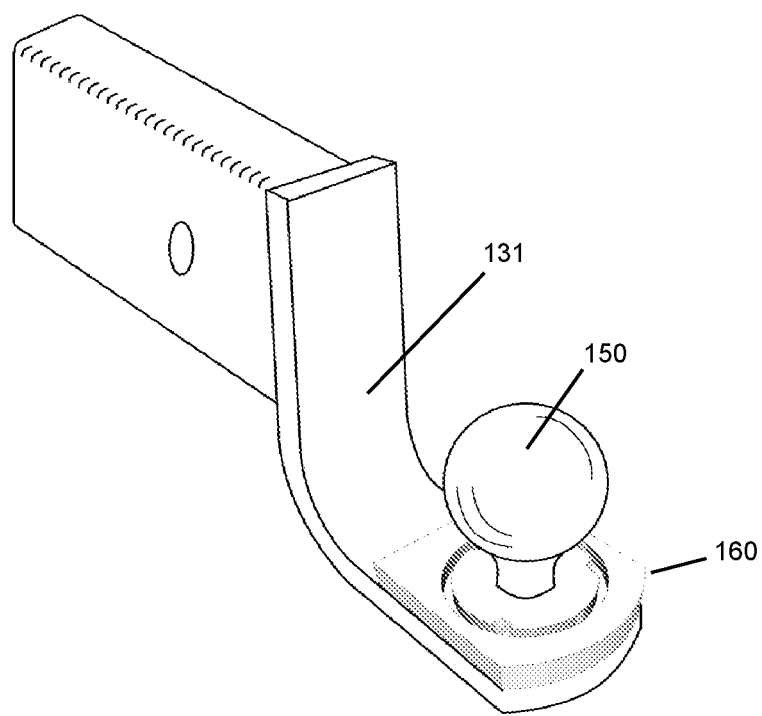
FIG. 4 depicts a hitch angle sensor adaptor plate mounted between a hitch ball and a hitch ball mount in accordance with various embodiments of the invention.
Figure 4B:
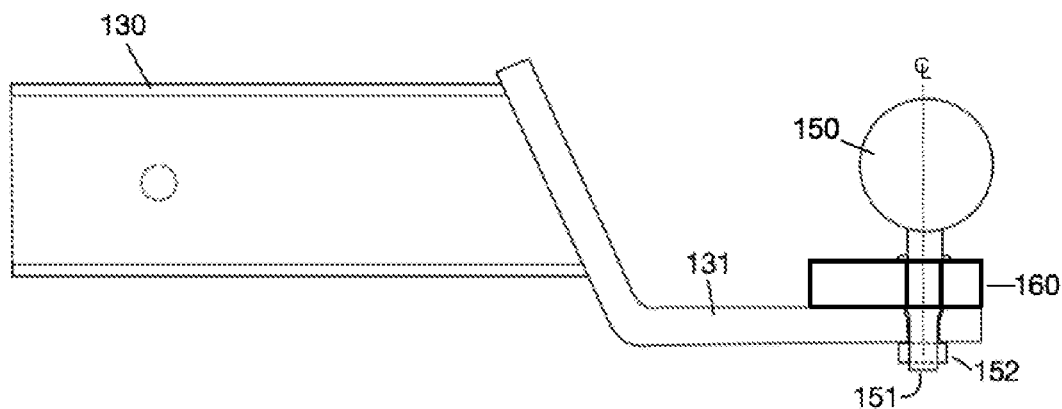

FIGS. 4A&B depicts the adaptor plate 160 after it is fastened between the hitch ball 150 and the hitch ball mount 131. Optionally to prevent the adaptor plate 160 from twisting and becoming misaligned while tightening the hitch ball nut 152, a textured surface can be incorporated into the bottom surface of the adaptor plate. The adaptor plate 160 is made of a hard material such as steel so that it can withstand the compression from the hitch ball after tightening the hitch ball nut 152 and also so that it can survive any accidental collision with a trailer tongue during vehicle to trailer coupling. Likewise, the recess 162 for the toothed ring 163 is to protect the toothed ring from corresponding damage. To prevent corrosion from forming over time and interfering with the smooth rotation of the toothed ring and its matching gear and supporting spacers, stainless steel is recommended. Many sensing circuits and mechanical configurations will be apparent to those skilled in the art in light of the present teaching.

Figure 5:
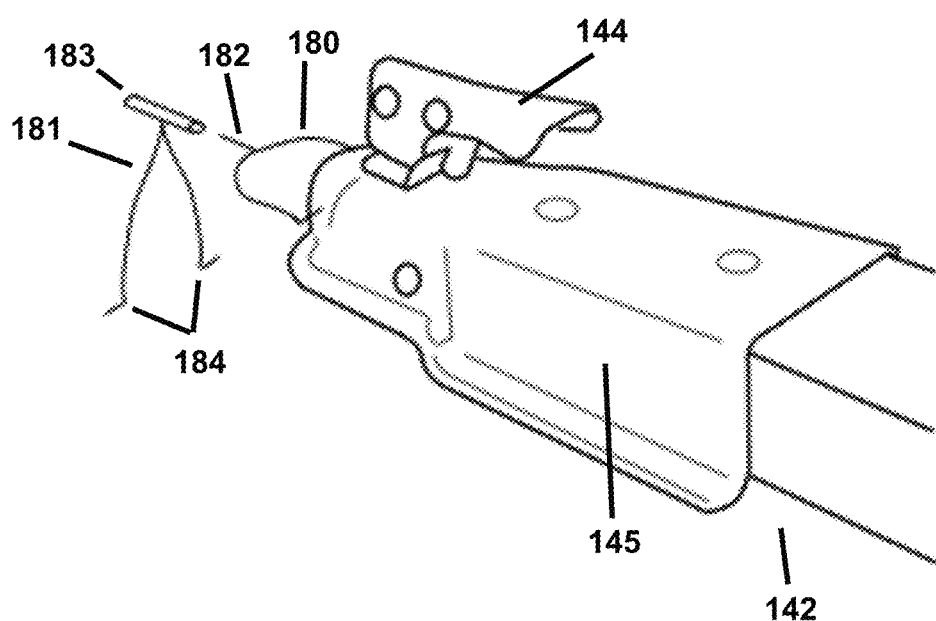
FIG. 5 depicts a stethoscope and wishbone interconnect in accordance with various embodiments of the invention.
Figure 6:
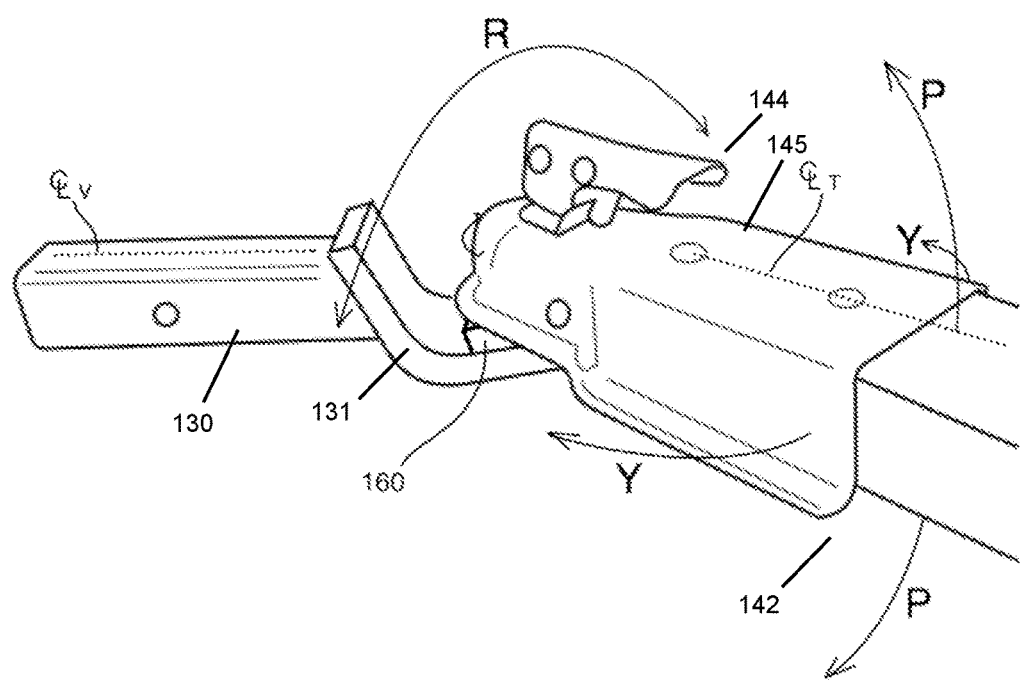
FIG. 6 depicts the motion of a coupled hitch ball and trailer tongue.

FIG. 5 depicts a connection device including stethoscope 180 and wishbone pin 181 to connect the trailer tongue 142 to the toothed ring 163. In this way, as the hitch angle changes, the stethoscope 180 and wishbone pin 181 will cause the toothed ring 163 to rotate in the circular groove 162 thereby causing the mechanical coupling to turn the magnet 168 which is sensed by the electronics 169. The stethoscope 180 and wishbone pin 181 is designed to be very inexpensive to make its replacement if lost non-costly. The stethoscope portion connects to the tongue 142 on opposite sides of the hitch ball equator either by drilling a small matching mating hole on each side of the tongue's coupler 145 or by attaching a supporting plate to either side of the tongue's coupler 145 with each plate having a similarly located matching mating hole (these supporting plates can be mounted by removing the bolts that fasten the coupler 145 to the tongue 142 and reinserting those bolts with the supporting plates inline as will be understood by those skilled in the arts). The stethoscope 181 is made from a springy wire and will snap into place in the matching mating holes with the spring pressure from opposite sides of the coupler providing enough pressure to hold it in place while still enabling the stethoscope to rotate in place in the matching mating holes. This ability to rotate in place will allow the trailer to pitch up and down (motion P in FIG. 6) without affecting the hitch angle measurement and without causing the stethoscope and wishbone pin to be dislodged. The neck 182 of the stethoscope 180 inserts into a tube 183 whereby the neck 182 can rotate freely within the tube 183 without excessive looseness or lash. This ability to rotate in place will allow the trailer to roll (motion R in FIG. 6) without affecting the hitch angle measurement and without causing the stethoscope and wishbone pin to be dislodged. The wishbone piece 181 comprises the tube 183 and two legs 184. These two legs 184 hold their opened position due to the springiness of the wire, but enable a user to pinch the two legs together such that the two feet can be inserted into a slot in either ends of connector mounts 175 in the toothed ring 163 and when the pinch is released, the two feet will engage an attachment receiving element, holes 176, in either ends of that slot in the toothed ring to hold the wishbone in place. The stethoscope can be formed from a single piece of wire where the neck portion is formed first by bending (at its center) the wire back against itself and then parting the two ends out and around the coupler. The wishbone can also be formed from a single piece of the same or similar type of wire by first coiling the middle portion of the wire to form the tube portion and then bending the wire down and apart to form the two legs. By fabricating the stethoscope and wishbone pin in this way, the cost of this component can be kept very low, making replacement if lost very affordable. The hitch angle being measured is sometimes also referred to as "yaw" (motion Y in FIG. 6).

A challenge in trailering second to backing up with the trailer attached is coupling the unattached trailer to the hitch. The vehicle on which the hitch is mounted must be backed up to the trailer coupler on the end of the trailer tongue very precisely. This is typically done with an assistant. The assistant must verbally direct the driver of the vehicle in how far to back up and in what direction to turn to bring the hitch ball into proper alignment for coupling. Such verbal directing can be a challenge. However, it is an aspect of the present invention that the same electronics and/or mechanics of the hitch angle sensor can be utilized to provide the driver with precise information of the direction aspect of the coupling maneuver.

It is an aspect of the present invention that a device for measuring the hitch angle for a vehicle's guidance system for backing up a coupled trailer could also be comprised, in whole or in part, by a system for guiding the vehicle to bring together its hitch ball with the coupler of an uncoupled trailer.

Figure 7:
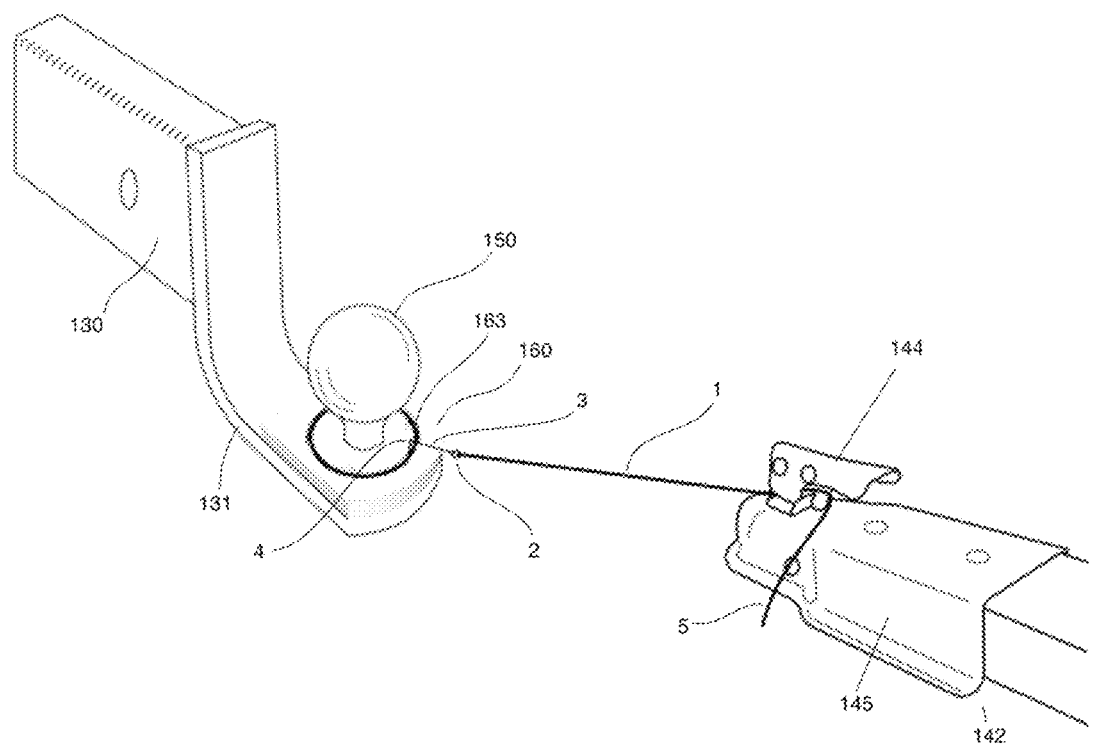
FIG. 7 depicts a generalized image of the hitch angle sensor being utilized for directional guidance of the hitch ball towards the trailer tongue in accordance with various embodiments of the invention.

We refer now to FIG. 7. The '283 Patent Application describes a hitch sensor 160 (which is attached to a hitch ball mount 131 by bolting it into position with the hitch ball 150) into which a toothed ring 163 is engaged by a pin. That pin connects to a coupler 145 that is mounted on the trailer's tongue 142. When in operation as a hitch sensor as part of a system for guiding a vehicle that is coupled to a trailer, coupler 145 is positioned about hitch ball 150 and locked into place on hitch ball 150 by a mechanism in the coupler 145 operated by lock lever 144. The measured hitch angle is the angle formed by the intersection of the centerline of the vehicle and the centerline of the trailer coupled to the vehicle where the vertex of the angle is at a point on the centerline of the vehicle (i.e., the hitch ball 150) that coincides with a point on the centerline of the trailer coupled to the vehicle (i.e., the part of the coupler 145 that is positioned about hitch ball 150). To provide a second function to hitch sensor 160 for guiding the vehicle to an uncoupled trailer for the purpose of coupling that trailer and vehicle together, a line 1 (or string or cord or wire or filament or the like) is tied or otherwise attached to spring pin 3 by means of an attachment loop 2 at one end of spring pin 3; on the other end of spring pin 3 is an attachment device including a wishbone spring 4 (similar to the attachment device to the wishbone spring pin described in the '283 Patent Application which is therein labeled 181) which is snapped into the toothed ring 163 such that the end 5 of the line 1 is pulled through an opening under lock lever 144 (or through a hole in the trailer coupler that pulls the cord 1 through the coupler 145 such that the cord 1 passes over the portion of the coupler that fits over the hitch ball 150). The assistant now would only need to pull on the end 5 of line 1 to keep it taught (without pulling so hard as to pop the wishbone spring 4 out of the toothed ring 163) and to instruct the driver on how far to back up. The driver would read the hitch angle on the back up guidance system as it could be read when operating the coupled trailer backup guidance system as described in the '283 Patent Application (the hitch angle could be displayed either numerically or graphically or in other forms that will be apparent to those skilled in the are in light of the present teaching—for example the display might indicate when the hitch angle is straight and if not straight, to which side of the center straight position the cord's direction is being pulled).

It is an aspect of the present invention that if an assistant is not available, the line can be kept taught by adding a weight to the end 5 of the line 1 such that gravity will keep the line taught. If the initial distance between the trailer tongue and the hitch ball is large, a support rod or tube with a pulley at the top can be utilized to increase the distance between the starting position of the weight and the ground. Furthermore, a distance sensing device could be incorporated to eliminate the need for the assistant to verbally indicate the distance remaining to be backed. This variation could include a leaf switch beneath the weight (e.g., inside the tube) to inform the driver that the distance between the trailer tongue and the hitch ball has been closed. Alternatively, it would be possible to inform the driver of the convergence as it happens by counting the revolutions of the pulley or by incorporating an ultrasonic range sensor 200 (such as that sold by Radio Shack part number 276-0342 which can measure distance from 3 cm to 4 meters) that could be removably mounted on the toothed ring 163 opposite the attachment point of wishbone pin 4 and line assembly (or permanently mounted on a companion assembly reserved for the purpose of coupling) such that the range sensor would be supported to the opposite side of and slightly above the hitch ball 150 (such that it has a clear line of sight to the trailer coupler in order to perform ranging measurements to the coupler 145) and pointing in the direction of the line 1. In this way, as the direction changes, the range sensor will be maintained pointing in the direction of the trailer coupler 145 (i.e., pointing down the line 1). The distance measured by the range sensor would be displayed on the back up guidance system (either numerically or graphically or in other forms that will be apparent to those skilled in the art in light of the present teaching). An alternative approach to measuring the distance would be to use an infrared or other optical range finding means as is well known in the prior art.

Another variation on the present invention would be to have a motorized winder automatically maintain the tension on the line thereby eliminating the need for an assistant to manage the line. Another variation on the present invention would be to place an ultrasonic transducer (for transmitting) onto the coupler and have two ultrasonic transducers (for receiving) either placed on either side of the hitch sensor equally spaced from the hitch sensor or placed one at the hitch sensor and one to the side of the hitch sensor such that the direction can be discerned by the delay in the received signal between the two receiving transducers. The transmitting transducers could be magnetically attached to the top of the ball socket of the coupler on the trailer. In addition to determining the direction, the distance to the coupler could also be discerned through triangulation; this triangulation could be calibrated by initially placing the transmitting transducer on top of the hitch ball before moving it to the coupler on the trailer. While the transmitting transducer would be battery operated, the receiving transducers would still leverage the electronics of the hitch sensor for power and communication with the back up guidance system on which display the coupling guidance distance and direction information would be indicated.

When used as a part of a system such as is disclosed in the '953 Patent, the '856 Patent, or any system enabling the calculation of a path for the vehicle (such as a system that can determine the turning angle of the wheels of the vehicle and the wheel base or that can determine the turning radius of the vehicle), the present invention could be used to aid the driver in coupling his vehicle with the trailer. Any other means for predicting the path of the vehicle could be utilized. For example, one could, by knowing (e.g., by sensing or measuring) the rotation, R, of a wheel (e.g., in degrees) on the left and on the right sides of the vehicle (where the subscripts $_L$ and $_R$ correspond to the left and right sides, respectively), and the diameter (D) of the wheels, compute the distance, d, traveled by each wheel as the vehicle moves a short distance, where:

$$d_L = \pi D \times R_L / 360 \text{ and}$$

$$d_R = \pi D \times R_R / 360,$$

determine to which side the vehicle is turning (if $d_L > d_R$, turning right, if $d_L < d_R$, turning left, and if $d_L = d_R$, going straight). One could additionally compute the circumference, c, of a circle on which each wheel could be traveling and solve for the corresponding radius, r, for each circle:

$$c_L = 2\pi r_L \text{ and}$$

$$c_R = 2\pi r_R.$$

The distances $d_L$ and $d_R$ each correspond to a portion of the circumference of a circle having a radius of $r_L$ and $r_R$, respectively, traveled by the vehicle, so each distance is an equal percentage, P, of its respective circumference, giving:

$$d_L = 2P\pi r_L \text{ and}$$

$$d_R = 2P\pi r_R.$$

Solve for P in terms of $r_R$:

$$P = d_R/2\pi r_R$$

By additionally knowing the width of the vehicle (the distance between the wheels, w), one knows the relationship between the two radii $r_L$ and $r_R$:

$$r_L = r_R + w$$

enabling the turning radius (at the centerline of the vehicle by adding ½ w), T, to be calculated:

$$d_L/2P\pi = d_R/2P\pi + w$$

and $$T = r_R + \tfrac{1}{2}w = w(d_R/d_L)/(1 - d_R/d_L) + \tfrac{1}{2}w$$

With the means to determine the path of the vehicle and with both the distance between the hitch ball and the trailer tongue's coupler and the direction to the trailer tongue's coupler (relative to some frame of reference such as the centerline of the vehicle as measured at the hitch ball) or, in the alternative, means to sense the direction to the trailer tongue's coupler from two different points such that the position of the trailer tongue's coupler can be located by triangulation, a guidance mechanism can be fashioned either in the form of a pointer and distance display, a graphical on screen display or, for vehicles having automated steering, an automatic vehicle to trailer coupling device. In an automated system, the operator could operate the accelerator and break or the vehicle could control the accelerator and break; this latter possibility of a self-driving vehicle is well known to those skilled in the art and has been demonstrated by such companies as Google. The key for assisted trailer coupling of any kind is to (i) steer the vehicle (either automatically or by providing the driver a display means as part of a feedback loop such that the driver can adjust and maintain a direction) such that the predicted path of the vehicle (or, more specifically, the path of the hitch ball mounted on the vehicle) intersects the point of the trailer tongue's coupler, (ii) control the accelerator of the vehicle, and (iii) control the breaks of the vehicle such that the vehicle can be moved along that path whereby hitch ball mounted on the vehicle will come to rest at the point where trailer tongue's coupler is positioned.

Precalibrated sensors are also contemplated. This preferred embodiment utilizes sensors that transmit a data byte corresponding to a measured angle whenever any data request byte is received. A more complex sensor could be constructed, as would be apparent to one skilled in the art, such that the angle measurement byte is only transmitted when a specific hitch angle data request byte is received. In this way, other data request bytes received could cause the transmission of other preprogrammed or real-time data bytes such as the wheel base of the vehicle (when used to measure steering angle), or the trailer length (when used to measure hitch angle), or other data such as a byte equal to the difference between two known angles (such as a difference equal to 90 or 180 degrees). In this way, the steering sensor or a device for determining the vehicle's turning radius is incorporated in the vehicle and the system could query that sensor or device for other preprogrammed data regarding that vehicle (e.g., wheel base, hitch length, the byte value for zero degrees of turning, the byte value for a specific known angle to eliminate the need to calibrate the scale factor, or the like) or the angle sensor could be incorporated in the trailer and the system could query that sensor for other preprogrammed data regarding that trailer (e.g., trailer length, the byte value for the zero degree angle, the byte value for a specific known angle to eliminate the need to calibrate the scale factor, or the like).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

I claim:

1. A device for a vehicle equipped to tow a trailer comprising a measurement device that (i) measures a rotational angle representative of the angle formed by the intersection of the centerline of the vehicle and the centerline of the trailer when the vehicle and the trailer are coupled with the center of rotation being located proximate to the point of coupling, and (ii) measures a directional angle representative of the difference between the current direction of the vehicle and a direction to bring the vehicle and trailer together to become coupled; further comprising a ring that encircles a hitch ball and a connection device with which a cord can be connected to the ring; further comprising the connection device with which the cord can be attached during directional angle measurement and with which a trailer coupler can be connected to the ring during rotational angle measurement.

2. The device of claim 1 further comprising a distance measuring device to measure the distance from a point on the vehicle to a point on the trailer proximate to the coupler.

3. The device of claim 2, wherein the distance measuring device further comprises one or more of an ultrasonic ranging device, an optical ranging device, and an infrared distance measuring device.

4. The device of claim 1, wherein the cord is one or more of a string or a cord or a wire or a filament or a line.

5. The device of claim 1 wherein the measurement device is bolted between a hitch ball and a hitch ball mount.

6. The device of claim 1, wherein the measurement device further comprises one or more electric components.

7. The device of claim 6, wherein the one or more electric components further comprises a wire to receive power from the vehicle.

8. The device of claim 7, wherein the wire is comprised by a wiring harness for electrically joining the vehicle and the trailer.

9. The device of claim 6 further comprising a wire to provide a data output.

10. The device of claim 9, wherein the wire to provide the data output is comprised by a wiring harness for electrically joining the vehicle and the trailer.

11. The device of claim 6 further comprising a wireless connection output to transmit data from the measurement device.

12. The device of claim 11, wherein the wireless connection further comprises one of a Bluetooth communications link, a WiFi communications link, a ZigBee communications link.

13. The device of claim 6 further comprising a battery to provide power to the one or more electric components.

14. The device of claim 1, further comprising a gear and a magnet, wherein the ring and gear cooperate to turn the magnet.

15. The measurement device of claim 1 further comprising an attachment receiving element and an attachment device (i) to attach between the receiving element and the trailer when the trailer is coupled to the vehicle such that the measurement device will measure the rotational angle of the trailer with respect to the vehicle, or (ii) to attach between the receiving element and a cord drawn towards the trailer such that the measurement device will measure the directional angle representative of the difference between the current direction of the vehicle and a direction to bring the vehicle and trailer together to become coupled.

16. The attachment device of claim 15 comprising a springable attachment mechanism.

17. The attachment device of claim 15 comprising one or more joints to suppress the effects of pitch or roll by the trailer.

18. The attachment device of claim 15 comprising a springable attachment mechanism.

* * * * *